US006604834B2

United States Patent
Kalana

(10) Patent No.: US 6,604,834 B2
(45) Date of Patent: Aug. 12, 2003

(54) ELECTROLUMINESCENT SURFACE ILLUMINATOR DEVICE

(76) Inventor: Blake H. Kalana, 7250 W. Greens Rd., #405, Houston, TX (US) 77064

( * ) Notice: Subject to any disclaimer, the term of this patent is extended or adjusted under 35 U.S.C. 154(b) by 0 days.

(21) Appl. No.: 09/892,754

(22) Filed: Jun. 28, 2001

(65) Prior Publication Data

US 2002/0003696 A1 Jan. 10, 2002

Related U.S. Application Data

(60) Provisional application No. 60/217,316, filed on Jul. 10, 2000.

(51) Int. Cl.[7] .................................................. F21V 9/16
(52) U.S. Cl. .................... 362/84; 362/495; 362/812; 362/485; 362/481; 362/505
(58) Field of Search ........................ 362/84, 495, 505, 362/540, 812, 485, 481; 40/544

(56) References Cited

U.S. PATENT DOCUMENTS

| 1,515,717 | A | | 11/1924 | Ayotte | |
|---|---|---|---|---|---|
| 2,264,109 | A | | 11/1941 | Bridge | |
| 4,463,962 | A | | 8/1984 | Snyder | |
| 4,544,991 | A | | 10/1985 | Gorsuch | |
| 4,557,494 | A | | 12/1985 | Elwell | |
| 4,819,136 | A | | 4/1989 | Ramsey | |
| 4,838,567 | A | | 6/1989 | Michanczyk | |
| 4,965,704 | A | | 10/1990 | Osborne, Jr. | |
| 4,985,810 | A | | 1/1991 | Ramsey | |
| RE34,275 | E | | 6/1993 | Ramsey | |
| 5,566,384 | A | | 10/1996 | Chien | |
| 5,641,221 | A | * | 6/1997 | Schindele et al. | 362/80 |
| 5,848,830 | A | * | 12/1998 | Castle et al. | 362/84 |
| D410,612 | S | | 6/1999 | Payne | |
| 5,915,830 | A | | 6/1999 | Dickson et al. | |
| 6,250,785 | B1 | * | 6/2001 | Mallia et al. | 362/511 |
| 6,244,734 | B1 | * | 6/2002 | Hulse | 362/495 |
| 6,419,306 | B2 | * | 7/2002 | Sano et al. | 296/209 |

* cited by examiner

Primary Examiner—Sandra O'Shea
Assistant Examiner—Anabel Ton
(74) Attorney, Agent, or Firm—Richard C. Litman

(57) ABSTRACT

A device and method for making an electroluminescent surface illuminator device comprising electroluminescent panels built into a running board, nerfbar, step or stepside for illuminating the foot/step placement for vehicles, planes, boats, and the like. The panels comprise an electroluminescent element, a transparent panel sealing said electroluminescent element therein, and wiring for connection to an external DC/AC power inverter placed between a flexible top panel and a rigid foundational base panel commensurate in size and shape with the flexible top panel. The electroluminescent panels can be illuminated by remote control in a vehicle or a parking light switch, a headlight switch or a dome light switch.

9 Claims, 4 Drawing Sheets

ELECTROLUMINESCENT SURFACE ILLUMINATOR DEVICE

CROSS-REFERENCE TO RELATED APPLICATION

This application claims the benefit of U.S. Provisional Patent Application Ser. No. 60/217,316, filed Jul. 10, 2000.

BACKGROUND OF THE INVENTION

1. Field of the Invention

The present invention relates generally to illuminated steps or stepped bumpers. More specifically, the present invention is an electroluminescent surface illuminator device comprising electroluminescent panels built into a running board, nerfbar, step, stepside or rear stepped bumper for illuminating the foot/step placement for vehicles, trains, planes, boats, buildings, and the like.

2. Description of Related Art

The related art of interest describes various illuminated devices, but none discloses the present invention. There is a need for a versatile accessory which attractively displays steps, bumpers, etc. when activated. The related art of interest will be described in the order of perceived relevance to the present invention.

U.S. Pat. No. 5,566,384 issued on Oct. 15, 1996, to Tseng-Lu Chien describes a vehicle with electroluminescent (EL) light strips enclosed in transparent and opaque sleeves which are energized by a D.C. power supply, an electric circuit, a function control circuit, and a push-button switch or sensor controlled switch in a housing. The EL strip is bendable and utilized as a warning light by gluing to the bumpers, installing inside proximate the rear window, and other external sides of the car. The EL light strip is distinguishable for failing to recognize the need to light steps.

U.S. Design Pat. No. 410,612 issued on Jun. 8, 1999, to James M. Payne describes a backlighted trailer step adjacent the rear wheels comprising the illumination of the top and sides of the trailer step. The design is distinguishable for omitting the particulars of the structure of the illumination.

U.S. Pat. No. 4,463,962 issued on Aug. 7, 1984, to Steven A. Snyder describes a running board and lighting assembly comprising an elongated, illuminated tube placed at the edge of a running board plate so that most of the step portion is illuminated when entering the vehicle. White or amber bulbs are used and energized when the cab door is opened or when the vehicle headlights are on, respectively. The running board lighting assembly is distinguishable for its limited frontal step placement and the activation methodology by opening the cab door or turning on the headlights.

U.S. Reissue Pat. No. 34,275 issued on Jun. 8, 1993, U.S. Pat. No. 4,819,136 issued on Apr. 4, 1989, and U.S. Pat. No. 4,985,810 issued on Jan. 15, 1991, to Edward Ramsey describe a lighted running board assembly comprising a flanged polyethylene housing attached to the front bottom surface of the running board and its light bulbs energized by the vehicle's battery by a switch. The lighted running board assembly is distinguishable for its mounting on the forward edge of the running board.

U.S. Pat. No. 1,515,717 issued on Nov. 18, 1924, to Joseph R. Ayotte describes an automobile running board footlight positioned in the vehicle's side by a kick-plate having a glass plate or lens above the running board illuminated by a light bulb. The footlight is distinguishable for its kick-plate position above the running board.

U.S. Pat. No. 2,264,109 issued on Nov. 25, 1941, to Lawrence D. Bridge describes a safety light for automobiles comprising a lamp housing having a front cover having a lens with curvature faces and a lamp with a conical side wall. The safety light is installed below the running board of the automobile or for wheel guards, front or rear of the vehicle, and within the vehicle. The safety light is distinguishable for its housed lamp installed below the running board.

U.S. Pat. No. 4,544,991 issued on Oct. 1, 1985, to Ralph E. Gorsuch describes a lighted running board comprising a deck and a kick plate. A rib depends downwardly from the deck. Openings are formed in the kick plate and rib which are provided with lights. Each light includes clips which allow the light to snap-fit into the opening. Each light is enclosed at its rear by a cover. The cover is a box-shaped member having a peripheral flange, which allows for its sealed securement to the kick panel or rib of the running board, protecting the light from dirt and moisture. The light is removable from the front of the running board which contains a decorative cover strip. The lighted running board is distinguishable for requiring snap-fit light bulbs in the deck and kick plate.

U.S. Pat. No. 4,557,494 issued on Dec. 10, 1985, to Dennis L. Elwell describes a running board cover having a series of lighting elements within an enclosed cavity along the outer edge of the running board, and a mounting structure including a channel on the underside of the running board deck, which channel supports a fastener and secures the fastener against rotation by the mating engagement of a channel rib with a slot in the head of the fastener. The illuminated running board cover is distinguishable for its light position on the front of the running board cover.

U.S. Pat. No. 4,838,567 issued on Jun. 13, 1989, to Gary F. Michanczyk describes a running board comprising a platform, a plurality of carriers and reinforcing cross members supporting the platform, the carriers being attached to the lower ends of mounting bars, wherein the upper ends thereof having attached cantilever bars which are also fastened onto the carriers forming a cantilevered support system for the platform. Optionally, a vertical cover panel is provided with illumination from light bulbs. The running board is distinguishable for its requirement to support the platform by attachment to the vertical rocker panel and L-shaped steel beam carriers attached to the U-frame member of the truck.

U.S. Pat. No. 4,965,704 issued on Oct. 23, 1990, to David B. Osborne, Sr. describes a running board light assembly positioned under the running board having several rectangular openings at each end. The housing also has aligned light bulbs which illuminate through the transparent front portion of the light assembly. The running board light assembly is distinguishable for requiring apertures in the running board.

U.S. Pat. No. 5,915,830 issued on Jun. 20, 1999, to Floyd R. Dickson et al. describes a light-tube running board lighting comprising a light tube positioned in the rear of the running board and energized at an end point by a light source such as a single incandescent bulb, light emitting diodes or halogen bulbs. The light-tube running board lighting system is distinguishable for its reliance on a light-tube.

None of the above inventions and patents, taken either singly or in combination, is seen to describe the instant invention as claimed.

SUMMARY OF THE INVENTION

The present invention is directed to an electroluminescent surface illuminator device comprising electroluminescent panels, e.g., oval, rectangular, etc., built into a running board, nerfbar, step, stepside, or bumper for illuminating the foot/step placement and rear bumper for vehicles, planes, boats, and the like. A remote control can be integrated for activating the device in vehicles. The electroluminescent device can also incorporate an advertisement.

Accordingly, it is a principal object of the invention to provide an electroluminescent surface illuminator device and the method for making same for vehicles, planes, boats, and the like.

It is another object of the invention to provide an electroluminescent surface illuminator device comprising various shaped electroluminescent panels built into a step.

It is a further object of the invention to provide an electroluminescent surface illuminator device built into a running board or nerfbar of a vehicle and energized by the vehicle's electrical system.

Still another object of the invention is to provide an electroluminescent surface illuminator device built into the stepsides and rear bumper of a vehicle and energized by the vehicle's electrical system via DC/AC inverter and a remote control.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an electroluminescent surface illuminator device. It is made up of a planar step surface with a flexible electroluminescent panel comprising an electroluminescent element sealed or covered by a transparent or translucent panel, and having wiring connected to an external DC/AC power inverter, which is connected to a battery. The device further has a rubberized top panel and a steel foundational base panel commensurate in size and shape with the rubberized top panel.

Figure 5:
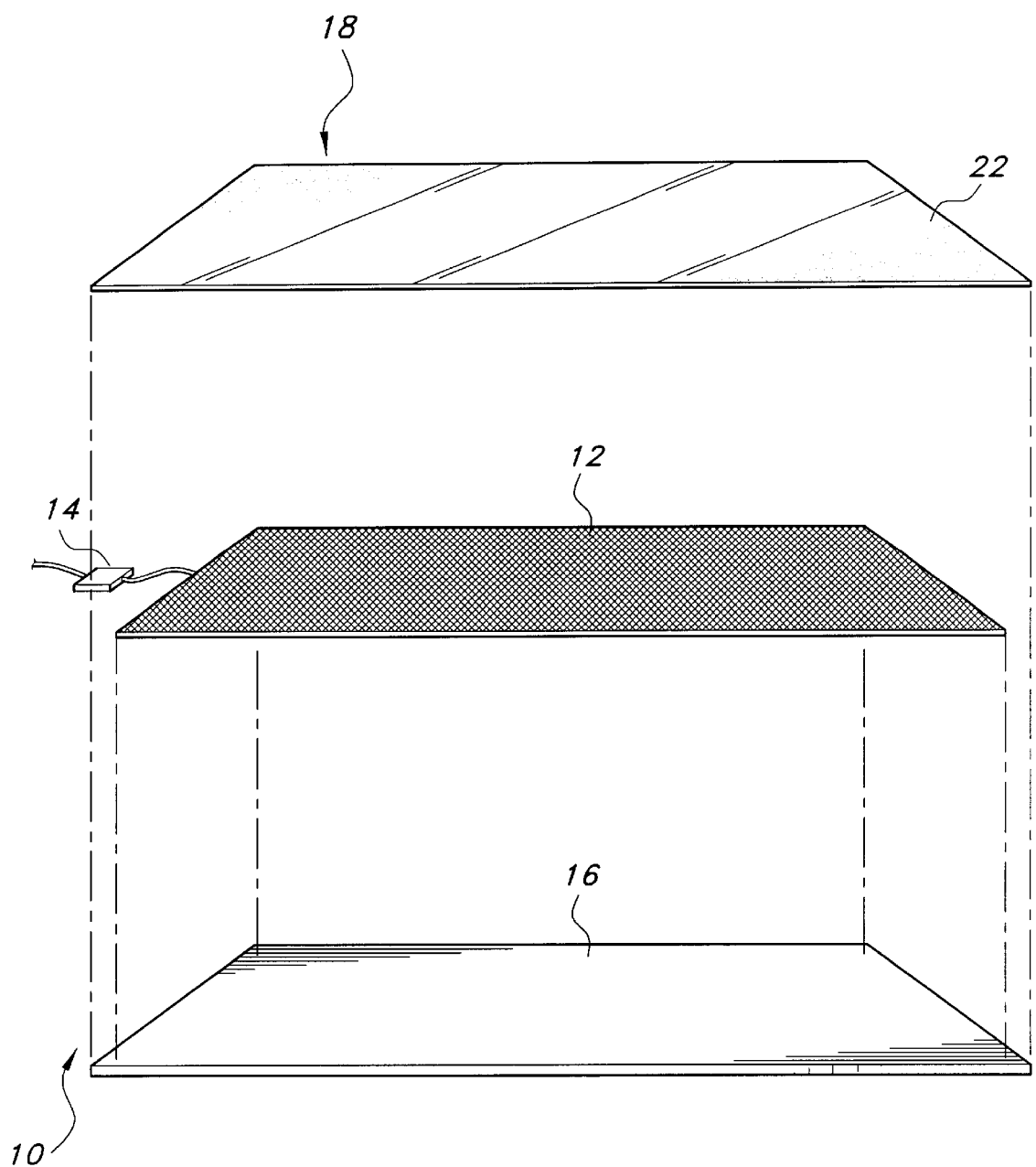
FIG. 5 is an exploded view of a basic construction of a step with inserted electroluminescent panels.

With reference first to FIG. 5, the basic construction of the invention will be discussed first. The heart of the invention 10 is an electroluminescent panel 12 sealed in a transparent or translucent material. The purpose of this sealed construction is to render the electroluminescent panel impervious to weather, wear and tear, scraping, scratching, puncturing, and a host of other potentially damaging environmental factors. External of panel 12 is a DC/AC power inverter 14 for the panel, connected by suitable wiring to a battery (not shown) or other DC power source. The panel 12 is seated on a foundational base 16. An enclosure top 18 is made up of a flexible panel of a rubberized transparent or translucent material and covers the top of the electroluminescent panel 12. The enclosure top 18 defines a top step surface 22 that has a texturized or other non-skid surface to prevent a person from slipping when stepping on the top step surface 22.

The resultant invention is very useful as a illuminator device for a running board, nerfbar, step, stepside, bumper, etc., for any sort of vehicle, planes, boats, and even in static environments (e.g., a house step or steps, walkway, etc.) if desired.

Figure 1:
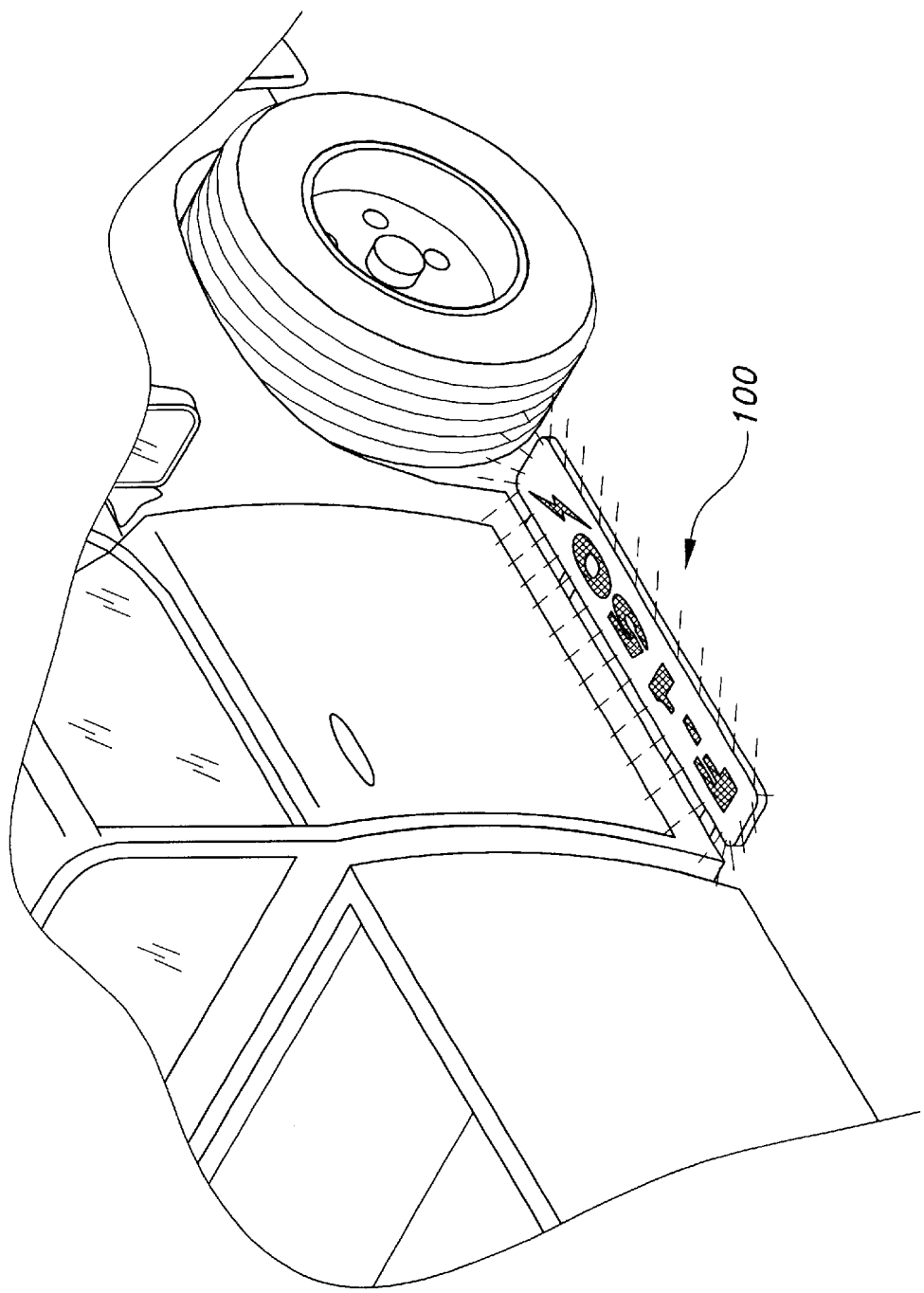
FIG. 1 is an environmental, perspective view of an electroluminescent illuminated step for a vehicle (e.g., pickup truck) as a first embodiment according to the present invention.
Figure 2:
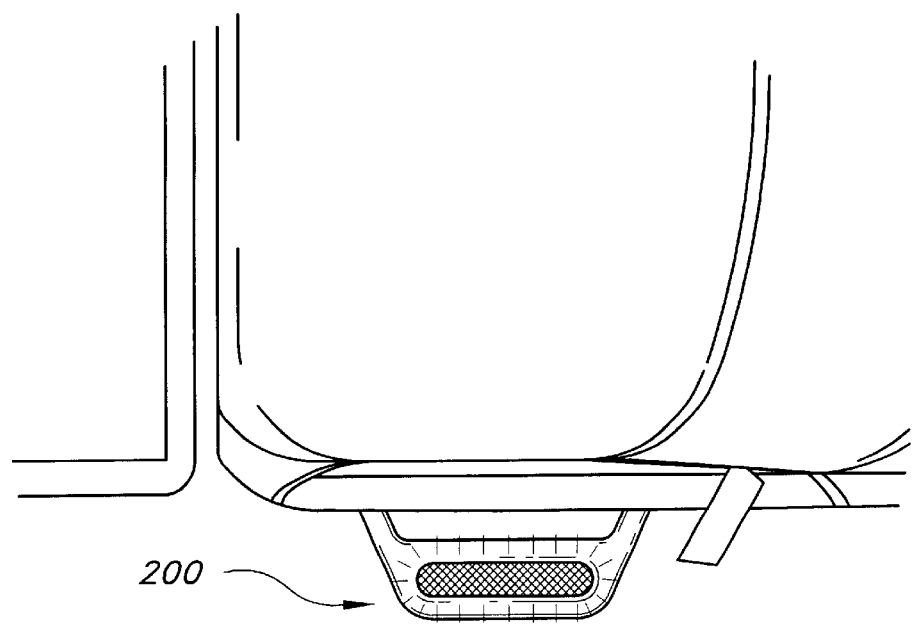
FIG. 2 is a front elevational view of a narrow step bar with the illuminated insert as a second embodiment.
Figure 3:
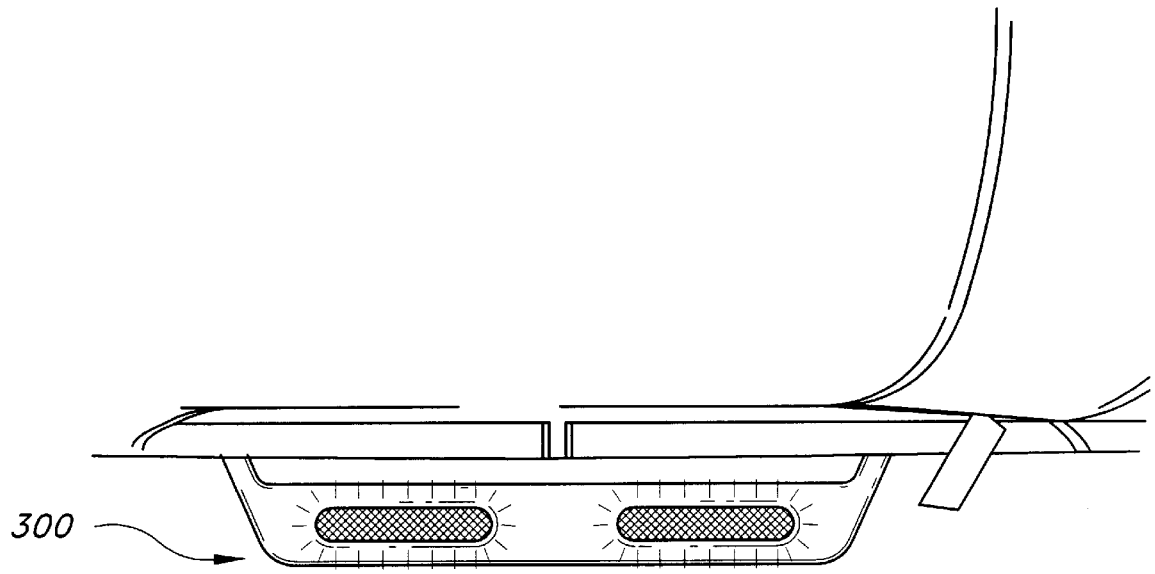
FIG. 3 is a front elevational view of a wide step bar with two illuminated inserts as a third embodiment.
Figure 4:
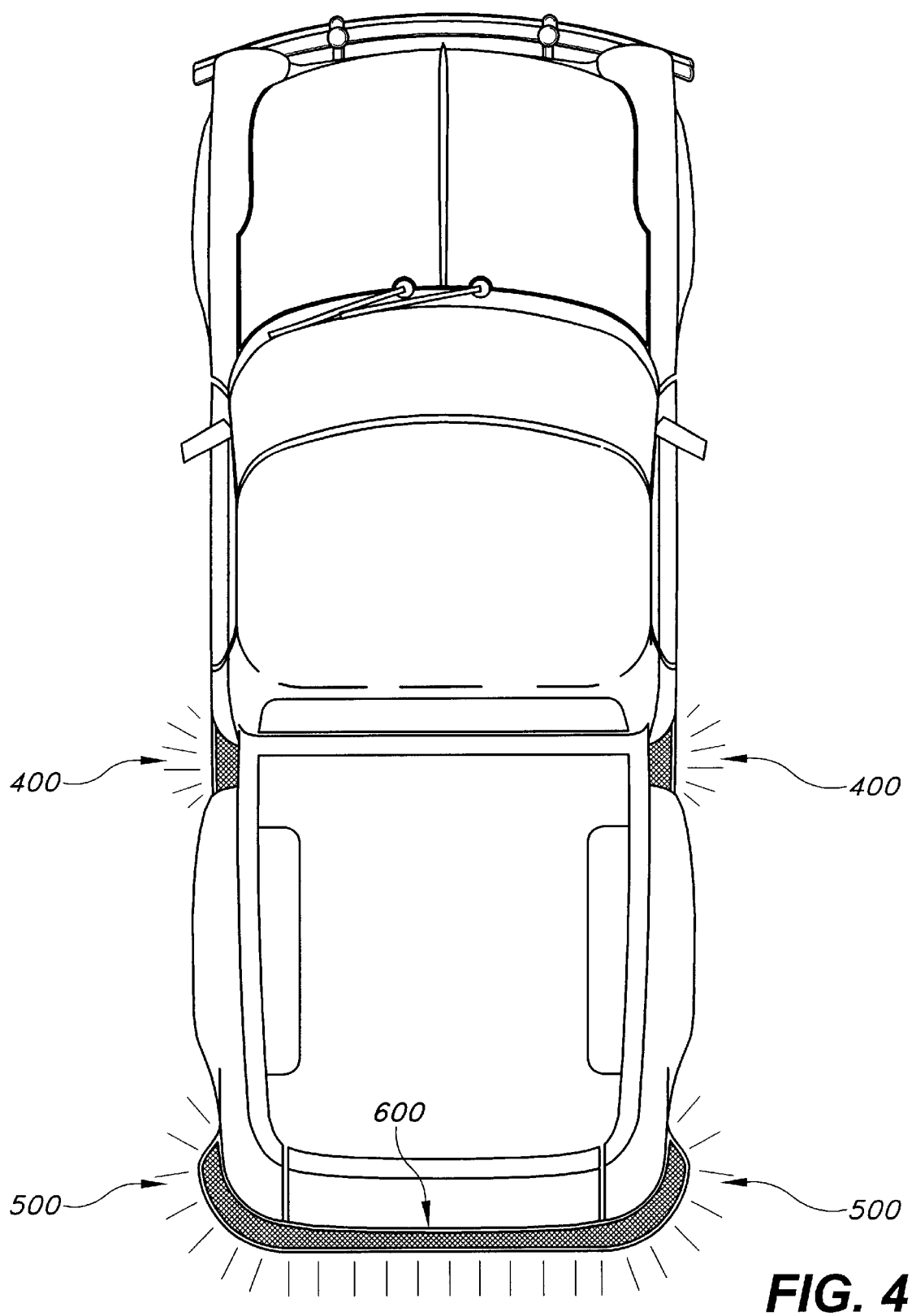
FIG. 4 is a partial top plan view of a pickup truck with electroluminescent stepsides and a stepped bumper as a fourth embodiment.

In FIG. 1, the invention 100 is illustrated as a running board or step bar for trucks, SUV's, vans, semi's, etc. In FIG. 2, the invention 200 is shown as a part of a step bar of a nerfbar, while in FIG. 3, the same is shown in a double configuration 300. A further configuration is illustrated in FIG. 4, with the invention 400 as step sides, and as rear stepsides 500 and a rear bumper 600. The electroluminescent panels 12 can be illuminated by remote control in a vehicle or a parking light switch, headlight switch or a dome light switch. Other many and varied applications will suggest themselves to those skilled in the art.

A method of making the invention will now be set forth. The electroluminescent panel 12 is sealed or sandwiched between the foundational steel base 16 and the transparent or translucent rubberized surface 22. Thereafter, the invention is placed on a step from the group consisting of a running board, nerfbar, step, stepside, or bumper for illuminating the foot/step placement and rear bumper for vehicles, planes, boats, and the like. Furthermore, the electroluminescent element can be any shape such as an oval or rectangular and may provide an advertisement. Again, the invention is useful with vehicle steps as well as with static surfaces.

It is to be understood that the present invention is not limited to the embodiments described above, but encompasses any and all embodiments within the scope of the following claims.

I claim:

1. An illuminated step assembly for a vehicle, comprising:
   a step for attachment to a vehicle, said step having an upper surface;
   a rigid base securely attached to the upper surface of said step;
   an electroluminescent panel disposed upon said base, said electroluminescent panel including an illuminating element;
   a substantially transparent top sheet of material covering said electroluminescent panel and attached to said base such that said electroluminescent panel is sealed between said top sheet and said base; said top sheet being fabricated of flexible, non-skid material; and
   wiring means electrically connected to said electroluminescent panel, said wiring means being connectable to an external power source.

2. The illuminated step assembly according to claim 1, wherein said step includes a running board.

3. The illuminated step assembly according to claim 1, wherein said step includes a side step bar.

4. The illuminated step assembly according to claim 1, wherein said step includes a rear step bumper.

5. The illuminated step assembly according to claim 1, wherein said step includes a step side.

6. The illuminated step assembly according to claim 1, wherein said top sheet is fabricated of a rubberized material.

7. The illuminated step assembly according to claim 1, wherein said wiring means is further connected to an external DC/AC power inverter.

8. The illuminated step assembly according to claim 1, wherein the illuminating element of said electroluminescent panel displays an advertisement through said substantially transparent top sheet.

9. The illuminated step assembly according to claim 1, further including means for remotely activating the illuminating element of said electroluminescent panel.

\* \* \* \* \*